US008538461B2

(12) United States Patent
Barkay et al.

(10) Patent No.: US 8,538,461 B2
(45) Date of Patent: Sep. 17, 2013

(54) SENTIENT ENVIRONMENT

(75) Inventors: Tair Barkay, Tel Aviv (IL); Shira Weinberg, Tel Aviv (IL); Hen Fitoussi, Tel Aviv (IL); Matt Dyor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 22 days.

(21) Appl. No.: 13/221,930

(22) Filed: Aug. 31, 2011

(65) Prior Publication Data

US 2013/0053068 A1 Feb. 28, 2013

(51) Int. Cl.
*H04W 4/02* (2009.01)

(52) U.S. Cl.
USPC .......................................... 455/456.3; 709/203

(58) Field of Classification Search
USPC ..................... 455/456.3, 556.1, 310; 705/26, 705/41, 400; 709/203
See application file for complete search history.

(56) References Cited

U.S. PATENT DOCUMENTS

| | | | | |
|---|---|---|---|---|
| 6,498,955 | B1 | 12/2002 | McCarthy et al. | |
| 2002/0081972 | A1 | 6/2002 | Rankin | |
| 2005/0096753 | A1 | 5/2005 | Arling et al. | |
| 2006/0212355 | A1 | 9/2006 | Teague | |
| 2008/0155429 | A1 | 6/2008 | Frank et al. | |
| 2009/0187489 | A1 * | 7/2009 | Mallick et al. | 705/26 |

OTHER PUBLICATIONS

Schlesinger et al.; Making Connections: Jukebox Firms Address Consumer and Social-Networking Lifestyles—Retrieved Date: Jun. 15, 2011: http://www.vendingtimes.com/ME2/dirmod.asp?nm=Vending+Features.

Building Brand Value and Influence in the Airline Industry—Retrieved Date: Jun. 15, 2011 Proceedings: The Yellow Papers Series, Author: NA, pp. NA http://www.brandchannel.com/images/papers/465_DDB_YP_AirlineBranding_final.pdf.

5 Ways Social Media Is Used for Businesses—Retrieved Date: Jun. 15, 2011 Proceedings: Social Brand Wagon, Author: NA, pp. NA http://socialbrandwagon.com/2011/05/5-ways-social-media-is-used-for-businesses/.

How to: Promote Your Small Business with Foursquare—Retrieved Date: Jun. 15, 2011 Proceedings: NA, Author: NA, pp. NA http://lexical-disambiguation.com/?p=67.

How to Claim a Facebook Places Page for Your Business—Retrieved Date: Jun. 15, 2011 Proceedings: Dummies.com, Author: Paul Dunay and Richard Krueger, pp. NA http://www.dummies.com/how-to/content/how-to-claim-a-facebook-places-page-for-your-busi0.navId-380723.html.

How Social Networks Influence Consumer Behavior—Retrieved Date: Jun. 15, 2011 Proceedings: Ecopreneurist, Author: Jennifer Kaplan, pp. NA http://ecopreneurist.com/2010/09/02/how-social-networks-influence-consumer-behavior/.

"International Search Report", Mailed Date: Feb. 1, 2013, Application No. PCT/US2012/049803, Filed date: Aug. 6, 2012, pp. 14.

* cited by examiner

*Primary Examiner* — Phuoc Doan
(74) *Attorney, Agent, or Firm* — A.C. Entis-IP Ltd.

(57) ABSTRACT

An embodiment of the invention provides a sentient environment that adapts itself to a person present in the environment responsive to active and/or passive expressions of preferences by the person.

11 Claims, 2 Drawing Sheets

SENTIENT ENVIRONMENT

TECHNICAL FIELD

Embodiments of the invention relate to environments that respond to a person's presence.

BACKGROUND

Present day communication systems support, a rich menu of different voice, video, text and data communication services between mobile and stationary communication terminals and the people who use them. In addition, they support internet connectivity and a growing variety of location based services. A location based service provides a person with information, entertainment and/or communications responsive to a spatial location of the person. The person's location is typically determined from a location of a mobile terminal, such as a smart phone, personal digital assistant (PDA), laptop, or workbook, which the person is using and carrying with him or her. Location of a mobile terminal may be provided by any of various wireless location technologies. The location technologies include, by way of example, those employed by global navigation satellite systems, such as the global positioning satellite (GPS) system, mobile telephone networks, and/or Wi-Fi and may be automatic and/or require performance of a check-in procedure by the person.

The services provided by the communication systems have given rise to emergent, new, communication and cultural behavior patterns, such as tweeting, short message service (SMS) texting, various forms of social networking, and massive political organizing. Businesses have adopted and configured the services to support and promote their sales. Today, using the services provided by the communication networks, fashion purchases may be made via the internet while consulting on the fashions with friends in a social network, and rewards and discounts on purchases can be acquired by using a location based service to check in at stores where the purchases are made.

SUMMARY

An embodiment of the invention relates to providing an environment, hereinafter referred to as a "sentient environment", which interacts with and adapts itself to a person present in the environment responsive to active and/or passive communications generated by the person. Active communications are communications intentionally generated by the person using a communication terminal and intentionally transmitted to the sentient environment via a communication system. Passive communications are communications generated responsive to the person's features, and/or gestures that are not intentionally made to communicate with the sentient environment, but which are sensed by a suitable sensing system, such as a gesture recognition system, comprised in or connected to the sentient environment. The environment may be any environment equipped to adapt itself to the presence of a person responsive to active and/or passive communications that he or she generates, and may for example be a restaurant, a retail store, or shopping mall.

In an embodiment of the invention, the sentient environment is connected to a wireless communication system, which in addition to supporting communication between a person and the sentient environment, provides the person with a location based service. The location based service operates to determine the person's presence in the environment and enable the person to engage in various activities and receive various services responsive to his or her determined presence in the environment.

The sentient environment comprises a computer system for controlling peripheral equipment, such as video and/or audio equipment, responsive to active and passive communications received via the communication system from the person to adapt the environment to the person's presence. The wireless communication system may, by way of example, include a mobile phone network, and/or the internet, and/or any of various wireless local area networks (WLANs). Optionally, the wireless communication system includes a gesture recognition system operable to sense and process gestures that a person makes. The gesture recognition system transmits information based on the gestures to the sentient environment computer system.

Active communications may be textual or vocal messages composed by the person using any of various mobile terminals, such as a smart phone, personal digital assistance (PDA), personal, and/or tablet computers, which the person transmits to the sentient environment via the communication system. For example, upon entering a restaurant, a "sentient restaurant", equipped to operate as a sentient environment, a person may be able to choose, or influence background music, and/or décor of the restaurant by using a smart phone to generate and transmit intentional "active communications", to the restaurant. Optionally, the active communications comprise responses to drop down menus transmitted to the smart phone by the restaurant. Active communications may also be gestures that the person intentionally makes to interact with the sentient environment via a gesture recognition system comprised in the communication system.

Passive communications may be communications generated by the gesture recognition system responsive to features of the person's body language, such as hand motions, gait, and or facial expressions, which are not intentionally made to communicate with the restaurant. A passive communication may also be a communication that identifies, that is "IDs", a person responsive to the gesture recognition system recognizing the person's face. For example, a gesture recognition system comprised in a sentient environment, such as a sentient sporting clothes store, may determine that a person entering the store is a smiling young woman in tennis attire, and may optionally ID the person as a returning customer. In response, the environment may show women's tennis competitions on wall videos in the environment, possibly accompanied by appropriate leitmotif background music known to be favored by the woman.

In an embodiment of the invention, a sentient environment computer system comprises at least one memory device in which the system stores personal files comprising historical data that profiles persons that interact with the environment. Personal historical data for a person may comprise data that indicates the person's likes and dislikes, and responses to adjustments made by the environment in attempting to adjust itself to increase a person's satisfaction in interacting with the environment. The computer system optionally generates responses to active and passive communications generated by a person entering the sentient environment responsive to the person's personal information file.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

In the following detailed description aspects of a sentient environment are discussed with reference to FIG. 1, which schematically shows a sentient restaurant interacting with diners seated in the restaurant and diners entering the restaurant. Seated diners are shown with areas of the restaurant in which they are seated adapted to the diners' tastes, in accordance with an embodiment of the invention. Entering diners are shown generating active and passive communications, which are transmitted to the restaurant for use in adjusting areas of the restaurant in which they are to be seated to the diners' tastes. One of the entering diners is using a smart phone to generate and transmit active communications to the restaurant. A sequence of wireframes shown in FIGS. 2A-2C schematically represents displays that the restaurant generates on the diner's smart phone during the exchange of communications between the diner and the restaurant. Another diner entering the restaurant is generating passive communications that are transmitted to the restaurant. A process by which passive communications are used to interact with the restaurant to adapt the restaurant environment to the diner's tastes are discussed with reference to the diner generating the passive communications.

Figure 1:
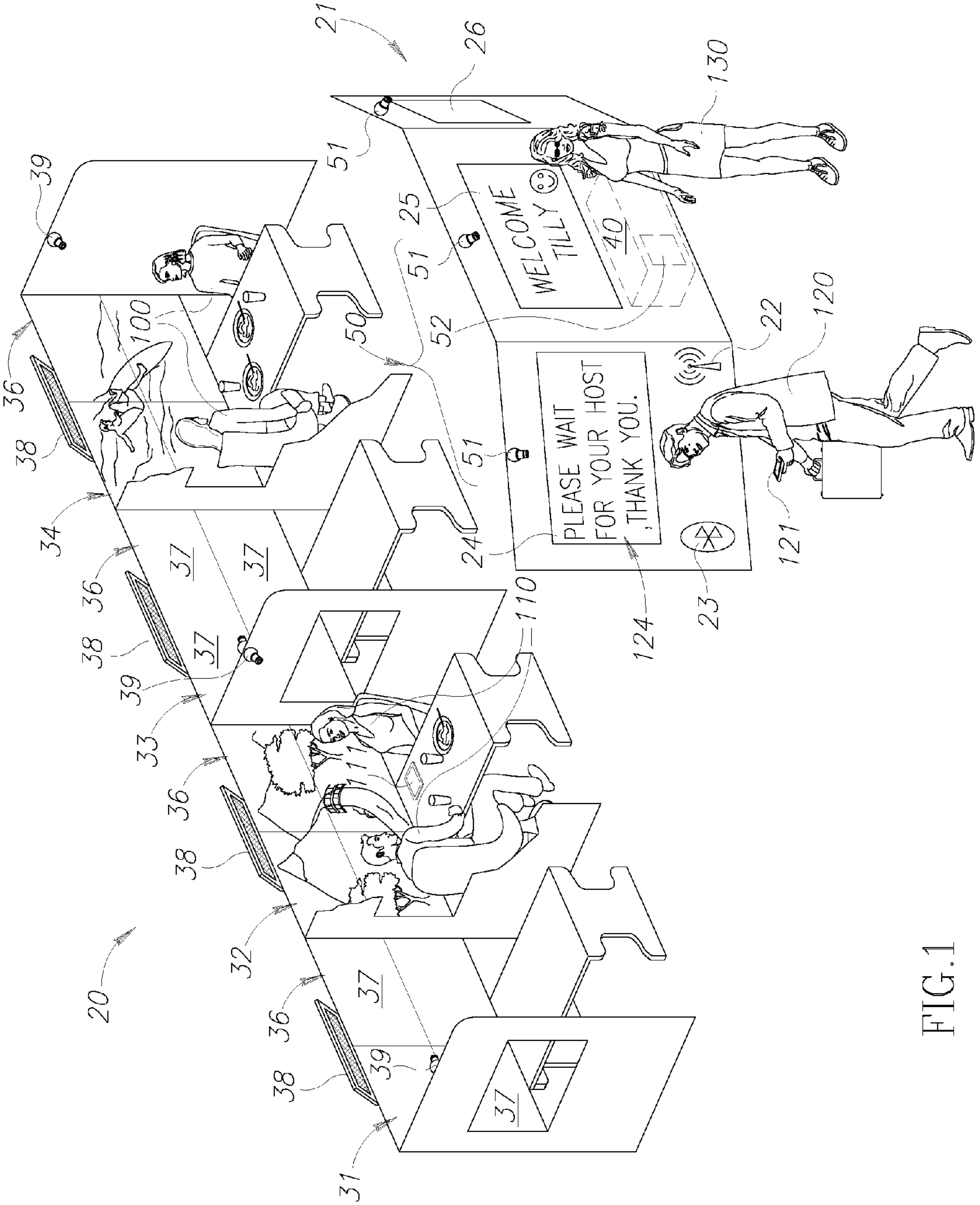
FIG. 1 schematically shows a portion of a sentient environment, configured as a restaurant operating as in accordance with an embodiment of the invention.
Figure 2A:
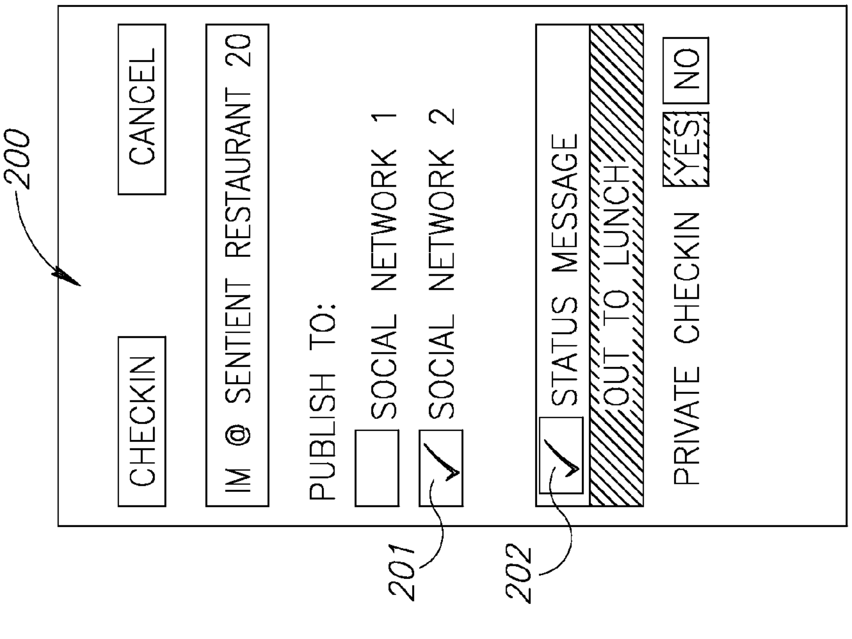
FIGS. 2A-2C show schematic wireframes illustrating active communication between a patron of the sentient restaurant shown in FIG. 1, in accordance with an embodiment of the invention.
Figure 2B:
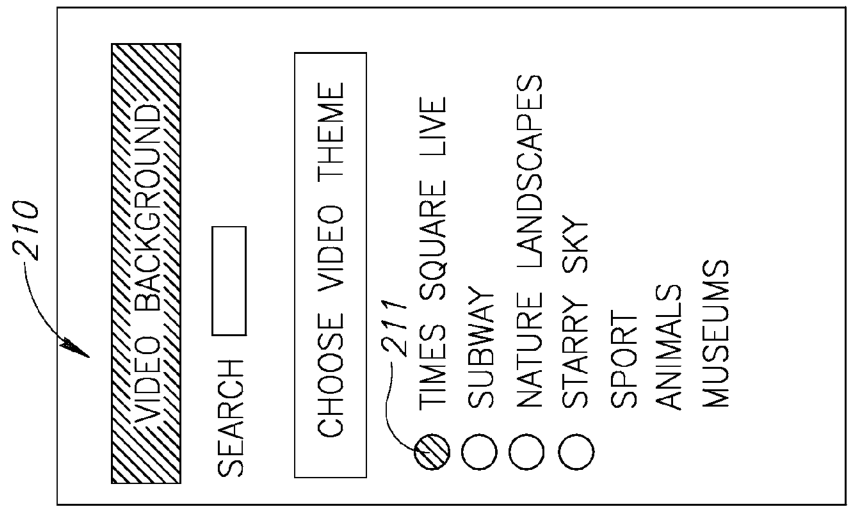
Figure 2C:
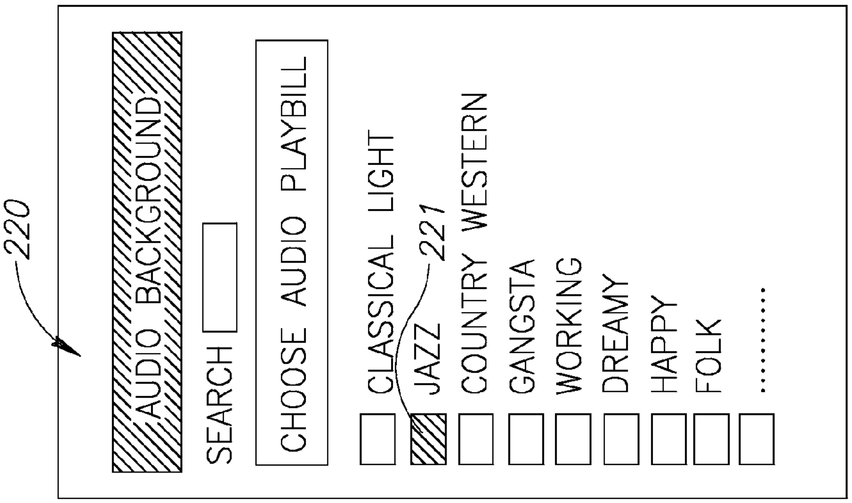

It is noted that communications described as being made by, to, or from a sentient environment, such as the sentient restaurant shown in FIG. 1, are understood to indicate communications by, to, or from the environment's computer system that processes and generates responses to communications transmitted to the environment. Similarly, text describing the environment as performing an act, such as adjusting background décor, are of course understood to mean the computer system as undertaking, controlling, and/or initiating the act.

FIG. 1 schematically shows a sentient restaurant 20 comprising an entrance foyer 21, and a plurality of dining booths 31, 32, 33, and 34, some of which are shown partially cutaway for convenience of presentation. Each booth has environment control apparatus controllable by a computer system 40 to adapt the dining booth to preferences of a diner or diners occupying the booth. Foyer 21 optionally comprises a Wi-Fi hot spot 22, and/or Bluetooth transceiver 23, and optionally video screens 24, 25, and 26 for presenting visual content to the diners.

In an embodiment of the invention sentient restaurant 20 has a gesture recognition system 50 comprising by way of example three cameras 51 located in foyer 21 for imaging restaurant patrons as they enter the restaurant, and a suitable computer executable instruction set for processing the images and identifying gestures. Optionally, computer system 40 is programmed with the gesture recognition instruction set, which is represented by a dashed square 52 in the computer system. Whereas computer system 40 is schematically shown as a system located on the restaurant premises, the computer system may be a distributed system having components and executable program code located in different servers, and may be partially or completely based on access to servers via the internet, that is partially or completely "cloud based".

In an embodiment of the invention, the environment control apparatus in each booth 31-34 comprises a video wall 36, optionally having four contiguous video screens 37 that are controllable to provide the booth with visual content and/or decor, and a sound system. The sound system in a booth is represented by a speaker 38 optionally located along a top edge of the booth's video wall 36. Speakers 38 and booths 31-34 are configured using any of various methods and/or apparatus such as sound insulating material and/or audio cancellation methods to substantially contain sound transmitted by a speaker 38 in a given booth 31-34 within the spatial volume of the booth. Optionally, each booth 31-34 comprises a pair of cameras 39, only one of which is shown in the figure for each booth, for imaging diners seated in the booth. Optionally, cameras 39 are connected to gesture recognition system 50, and transmit images of diners to the system for processing and gesture identification.

By way of example, in FIG. 1 sentient restaurant 20 is shown with booth 34 occupied by women 100, booth 32 occupied by a couple 110, and diners 120 and 130 entering the restaurant. Occupied booths 32 and 34 have been adapted by sentient restaurant 20 to the taste preferences of the diners seated in the booths, in accordance with an embodiment of the invention.

With respect to the women seated in booth 34, one of the women had a location based service application, supported by any of various technologies such as GPS, WiFi, and/or blue tooth, actively running on her smart phone (not shown) when the woman entered sentient restaurant 20. Upon entering the restaurant, the location based service made the woman's presence in the restaurant known to the restaurant by suitable communication of the location to computer system 40. In response to the woman's presence, the sentient restaurant, that is computer system 40, optionally sent an SMS to her smart phone asking her to access a menu on the restaurant mobile internet site offering a choice of decors and background music for a booth in which women 100 were to be seated.

The women are avid surfers and the woman with the smart phone responded by accessing and using the menu to transmit an active communication to the restaurant to indicate they would like a beach scene and appropriate background audio. In response, a restaurant hostess (not shown) seated the women in booth 34 and computer system 40 configured video wall 36 of the booth with an, optionally still, surfing panorama shown on the video wall accompanied by soft sounds of waves breaking on a shore provided by speaker 38 in the booth.

Whereas in the above description access to a functionality, that is choice of background décor and music, of the sentient restaurant is made available to the woman by an SMS, embodiments of the invention are not limited to making functionalities available via SMSs. For example, a functionality offered to a person by a sentient environment may automatically "surface" on the person's mobile terminal upon the person entering and being recognized as present in the environment. Automatic surfacing may be provided by an adaptive application that is activated by presence of the person in the environment. The functionality may also be offered and/or announced on a suitable audio and/or video interface, for example, video screens 24, 25 or 26 in sentient restaurant 20, comprised in the sentient environment.

Couple 110 seated in booth 32 operated a tablet computer 111 after being seated in the booth to actively communicate with sentient restaurant 20 via Wi-Fi hot spot 22, and requested nature scenes for background decor in response to a menu transmitted to the tablet computer by the restaurant. Sentient restaurant 20 responded by screening a slide show of nature scenes on video wall 36 accompanied by music from the Four Seasons concertos by Vivaldi. Cameras 39 in booth 32 imaged the couple and the images were processed by gesture recognition system 50. The gesture recognition system determined, optionally responsive to gaze times exhibited by couple 110 associated with different nature scenes presented on video wall 36, that summertime nature scenes appeared to be preferred by couple 110. Computer system 40 therefore biased the slide show to summertime scenes. The information communicated by images of couple 110 acquired and processed by gesture recognition system 50 that indicated the preference for summertime scenes is an example of a passive communication.

Diner 120 is a businessman who has activated a location based check in service on his smart phone 121 and has used the service to check in at sentient restaurant 20. FIGS. 2A-2C show a sequence of wireframes that are presented on smart phone 121 by sentient restaurant 20 subsequent to businessman 120 checking in at the restaurant. The wireframes schematically illustrate interactions of the businessman with the restaurant by which he makes the restaurant aware of his preferences for a booth environment.

FIG. 2A shows a schematic wireframe 200 of a check in display on smart phone 121 that businessman 120 has used to indicate his checking in at sentient restaurant 20. The businessman has selected radio button 201 in wireframe 200 to have his presence at the restaurant published on social network 2. The businessman has also checked status message radio button 202 on the wireframe to alert his associates with a message that he is "out to lunch" and presumably should not be bothered.

In response to checking in, sentient restaurant 20 sends businessman 120 a menu, represented by a schematic wireframe 210 shown in FIG. 2B for choosing a video background for a booth at which he will be seated. The businessman has just adjourned from an intense but successful business meeting, and is feeling excited and energetic. He selects a radio button 211 shown in wireframe 210 to choose a "Times Square Live" scene that shows a dynamic video of pedestrian and vehicular traffic moving through Times Square New York. After choosing the video background, sentient restaurant 20 transmits an Audio Background menu, represented by a wireframe 220 shown in FIG. 2C, to smart phone 121 to provide businessman 120 with a choice of audio background. The businessman selects a radio button 221 shown in the wireframe to choose a jazz audio playbill to accompany the "Times Square Live" video background.

Upon receiving the choices made by businessman 120, (FIG. 1) computer system 40 prepares a booth 31 for the businessman in which video wall 36 shows "Times Square Live" and speaker 38 plays the jazz playbill. The computer system displays an image 124 optionally, on video screen 24, thanking the businessman for his patronage and asking him to wait for a host to seat him.

Diner 130 is a young woman who is a frequent patron of sentient restaurant 20 and for whom the restaurant computer system 40 has compiled and stored a personal profile of her preferences from her past visits to the restaurant. She has not activated a location based service for checking into the restaurant, but as she enters the restaurant, a camera 51 comprised in gesture recognition system 50 acquires images of her and sends the images to computer system 40. The computer system processes the images and identifies her responsive to her facial features in the images and her personal profile and welcomes her by name with a greeting displayed on video screen 25.

Upon referencing her personal profile, the computer system prepares a booth for the woman that shows her favorite video background (not shown) on the booth's video wall 36 and plays her favorite background music. Determining from her personal profile that she favors pecan pie and vanilla ice cream for dessert, computer system 40 optionally includes a notification on the video wall display of the booth in which she is eventually seated that a pecan pie and vanilla ice cream desert is offered to her gratis with an order for lunch. In an embodiment of the invention, computer system 40 may interact with the woman's mobile terminal, for example a smart phone, tablet, or laptop, and causes the device to display a menu customized to her known tastes, and optionally in language of her preference.

It is noted that whereas sentient restaurant 20 is configured to tailor small dining areas, that is booths 31-34, differently to simultaneously accommodate different tastes of different patrons, a sentient environment may of course provide a same environment to all persons present in the environment. To accommodate individual preferences, the environment is changed sequentially in accordance with preferences of people present in the environment to adapt the environment to the preferences.

For example, assume that a retail store operates as a sentient environment that includes a store wide "jukebox" sound system controlled by the store's computer system to play customer requested music. As a customer enters the store, the customer may check in to the store on his or her mobile communication terminal such as a mobile phone, PDA, or notebook, to alert the store to his or her presence. Once alerted, the store sends a display to the mobile terminal optionally showing a current status of a playlist of music requested previously by customers and programmed for playing. The display provides a menu that enables the entering customer to add a piece of music that the customer prefers to the playlist. Optionally, if the customer is a preferred customer, the customer may be able to have her favorite music played out of turn, that is, before music previously chosen by other customers being played.

In an embodiment, customers in the store are enabled to operate collectively in choosing or modifying the playlist. For example, the store may enable customers to vote to change a song's position in the playlist. A customer may be able to allow other customers see how he or she voted, and/or view his or her music preferences. Customers may be able to chat and/or message with other customers who are controlling the jukebox playlist, and/or customers who have voted for a particular song. In an embodiment of the invention, the store may recommend and/or introduce customers who have similar musical interests to each other. The store may provide a customer's mobile terminal with real-time, in-store location information of other customers in the store to enable a rendezvous between customers who are interested in meeting.

In an embodiment, the store may issue a customer with points that may be redeemed for various benefits that the store might make available and/or that can be used to interact with the store or other customers in the store. By way of example, the points may be used to add songs to the playlist and/or control an order in which songs are played at a cost in points. Songs may be priced uniformly in points, or may have different "price tags", with some songs more expensive than others. Optionally, points are granted to a customer responsive to purchases made by the customer and/or to activities engaged in by the customer while in the store premises. For example, a customer may be granted a bonus in points if the customer invites and successfully brings a friend into the store while the customer is in the store. Granted points may be cumulative from store visit to visit and/or tradable among store customers while in and/or outside the store premises.

Different stores may of course configure and manage a jukebox playlist and options differently. A given store management may make only a particular genre, for example, country western, hip-hop, or classical, of songs available for playlisting that suites the store ambience. The store may coordinate performances of playlisted songs with guest appearances of musicians, song writers, and/or singers to promote the store.

It is further noted that whereas in the above description of a sentient restaurant only background décor and sound are indicated as being adapted to a person's presence in the restaurant, a sentient environment is not limited to adapting only décor and sound to a person's presence. For example, a sentient environment may comprise a climate control system for adapting temperature or humidity of a region of the environment to a person's preference. By way of another example, a sentient environment may comprise a lighting system that adapts intensity of ambient light to adjust the environment to a person's preference or need.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. An environment comprising:

apparatus controllable to modify the environment the apparatus comprising at least one system chosen from the group consisting of a sound system controllable to provide background sound in the environment and a video system controllable to provide different visual backgrounds in the environment;

a computer system that controls the apparatus; and a communication system providing a location based service that is configured to transmit a communication to the computer system comprising an indication of a preference of a person determined by the location based service to be present in the environment, which indication the computer system uses to control the apparatus to modify the environment.

2. An environment according to claim 1 wherein the communication system comprises a mobile terminal and the communication comprises an active communication intentionally composed and transmitted by the person using the terminal.

3. An environment according to claim 1 wherein the communication system comprises a gesture recognition system and the communication comprises a communication generated by the gesture recognition system responsive to a gesture not intentionally made to communicate with the environment.

4. An environment according to claim 1 wherein the computer system comprises a memory device having stored therein a preference of the person and the computer system uses the stored preference to control the apparatus to modify the environment.

5. An environment according to claim 1 wherein the communication system comprises a gesture recognition system and the communication comprises a communication generated by the gesture recognition system responsive to a gesture made by the person to communicate with the environment.

6. A method of modifying an environment, the method comprising:

using a location based service to determine presence of a person in the environment;

enabling a communication channel for receiving a communication comprising a preference from the person responsive to the determined presence;

receiving a preference for a modification of the environment from the person via the enabled communication channel; and modifying the environment responsive to the preference by modifying background sound in the environment or a visual background in the environment, or modifying both the background sound and the visual background.

7. A method according to claim 6 wherein the communication comprises an active communication intentionally composed and transmitted by the person.

8. A method according to claim 6 wherein the communication comprises a passive communication generated by a gesture recognition system responsive to a gesture not intentionally made to communicate a preference.

9. A method according to claim 6 wherein the preference comprises a preference for a décor.

10. A method according to claim 6 wherein the preference comprises a preference for a musical composition.

11. A method according to claim 6 wherein the communication comprises a communication generated by a gesture recognition system responsive to a gesture intentionally made by the person to communicate a preference.

* * * * *